(12) United States Patent
Bernhardt

(10) Patent No.: US 8,542,795 B2
(45) Date of Patent: Sep. 24, 2013

(54) METHOD FOR OBTAINING HIGH-CONTRAST X-RAY IMAGES AND X-RAY BEAM DETECTOR

(75) Inventor: Philipp Bernhardt, Forchheim (DE)

(73) Assignee: Siemens Aktiengesellschaft, Munich (DE)

( * ) Notice: Subject to any disclaimer, the term of this patent is extended or adjusted under 35 U.S.C. 154(b) by 336 days.

(21) Appl. No.: 13/105,502

(22) Filed: May 11, 2011

(65) Prior Publication Data

US 2011/0280370 A1    Nov. 17, 2011

(30) Foreign Application Priority Data

May 14, 2010 (DE) .......................... 10 2010 020 611

(51) Int. Cl.
G01N 23/04 (2006.01)
(52) U.S. Cl.
USPC .......................... 378/62; 378/98.11; 378/98.8
(58) Field of Classification Search
USPC ...................... 378/19, 62, 98.8, 98.11, 98.12; 382/128–131; 250/370.08, 370.09, 370.11
See application file for complete search history.

(56) References Cited

U.S. PATENT DOCUMENTS

| 7,286,631 B2 | 10/2007 | Li et al. ............................ 378/21 |
| 7,557,356 B2 | 7/2009 | Yuan et al. ................ 250/370.11 |
| 2006/0182322 A1 | 8/2006 | Bernhardt et al. ............. 382/128 |
| 2008/0128631 A1 | 6/2008 | Suhami ..................... 250/370.19 |
| 2009/0166546 A1 | 7/2009 | Fleischmann et al. ... 250/370.11 |
| 2010/0053201 A1 | 3/2010 | Klassen et al. ................ 345/601 |

FOREIGN PATENT DOCUMENTS

| DE | 102005046820 A1 | 4/2007 |
| DE | 102008047629 A1 | 3/2010 |

*Primary Examiner* — Courtney Thomas
(74) *Attorney, Agent, or Firm* — King & Spalding L.L.P.

(57) ABSTRACT

An X-ray radiation detector (100) consists of an arrangement with photodetector elements (12) and a scintillator layer (14) on the same. It is assumed in an exemplary fashion that the scintillator layer (14) subjects an input signal, which describes an object to be imaged, to a convolution with a modulation transfer function. The effect of this can be cancelled, particularly by obtaining a test X-ray image in advance, with the aid of which this modulation transfer function, or a similar variable providing information on the modulation transfer function, is established. If use is made of photodetectors that are based on CMOS technology, use can be made of a particularly thick scintillator layer made of gadolinium oxysulfide, which absorbs a particularly large amount of X-ray radiation. High-contrast X-ray images are obtained in this fashion.

16 Claims, 2 Drawing Sheets

METHOD FOR OBTAINING HIGH-CONTRAST X-RAY IMAGES AND X-RAY BEAM DETECTOR

CROSS-REFERENCE TO RELATED APPLICATIONS

This application claims priority to DE Patent Application No. 10 2010 020 611.3 filed May 14, 2010. The contents of which are incorporated herein by reference in its entirety.

TECHNICAL FIELD

The invention relates to a method for obtaining high-contrast X-ray images with the aid of an X-ray beam detector of a certain type.

BACKGROUND

The X-ray beam detector has an arrangement of light-sensitive detector elements, and there is a scintillator layer on this arrangement. The object of the scintillator material is to convert individual X-ray quanta into a plurality of light quanta, and these light quanta can then be registered with the aid of the light-sensitive detector elements (photodetectors). The arrangement of the light-sensitive detector elements conventionally forms a two-dimensional grid and, in order to define a respective X-ray image, a grayscale value, emerging from a measurement with the aid of the detector element, is defined for each detector element. The X-ray image is formed by the grayscale values in a pixel arrangement that corresponds to the arrangement of the detector elements.

The scintillator now emits light in a plurality of directions, and said light may then also be scattered in certain circumstances. An impact point of a light quantum on the scintillator therefore corresponds to various impact points of the light quanta produced by the X-ray quantum. Hence, the actual X-ray image may be slightly "smeared". The contrast is reduced.

It is for this reason that the scintillator layer is not allowed to be too thick so that it can generate sufficiently high-contrast X-ray images. Then again, the number of X-ray quanta being converted into light increases as the scintillator layer becomes thicker.

The scintillator layer was previously produced from cesium iodide (CsI). By way of example, in the case of a detector for X-ray angiography, the scintillator layer made of cesium iodide has a thickness of 500 µm at a density of approximately 3.6 g/cm$^3$. If a voltage of 125 kV is applied to the X-ray beam tube, and if an object made of water ("patient") to be imaged has a thickness of 400 mm, the maximum absorption is only approximately 40%. Hence, 60% of the X-ray radiation is lost.

Nevertheless, cesium iodide has previously been considered the gold standard because it is possible to form rod-shaped crystals made of this material: provision is made for a multiplicity of needles, which run parallel with respect to one another. At the walls of these needles or rods, there is total internal reflection of the light generated therein, and so the light is routed to the detector elements in more or less a straight line, as in an optical fiber.

X-ray beam detectors with a scintillator layer made of cesium iodide are very expensive, for example compared to gadolinium oxysulfide, $Gd_2O_2S$, the otherwise also possible material.

Thus, conventional X-ray beam detector have the property that they are expensive, but nevertheless only register a comparatively low proportion of the X-ray radiation.

SUMMARY

According to various embodiments, a way of being able to generate high-contrast X-ray images can be pointed out, without the occurrence of the disadvantages of conventional devices. In particular, according to various embodiments it should be possible to produce higher-contrast X-ray images than before, or it should be possible to produce X-ray images with a certain contrast in a more cost-effective fashion.

According to an embodiment, a method for obtaining high-contrast X-ray images with the aid of an X-ray beam detector, which has an arrangement of light-sensitive detector elements beneath a scintillator layer, wherein each detector element provides a grayscale value in a pixel arrangement for defining an X-ray image, may comprise the following steps: obtaining a test X-ray image of a predetermined object with the aid of the X-ray beam detector, deriving at least one mathematical variable or at least one function of a variable from the test X-ray image, which variable, under the assumption that the generation and scattering of light in the scintillator layer is understood as a convolution of an input signal of the incident X-ray radiation with a transfer function, provides information relating to the transfer function, obtaining a raw X-ray image of an object to be imaged with the aid of the X-ray beam detector, and processing the raw X-ray image using the at least one variable or the at least one function in order to remove, at least in part, the effect on the image contrast of the light propagation within the scintillator layer.

According to a further embodiment, the test X-ray image can be subjected to a Fourier transform and the Fourier-transformed transfer function can be calculated in the frequency space on the basis of a known Fourier transform of the predetermined object. According to a further embodiment, the raw X-ray image may likewise be subjected to a Fourier transform and a Fourier transform of the object to be imaged is calculated there from the Fourier transform of the raw X-ray image and the Fourier transform of the transfer function, and this Fourier transform of said object to be imaged is subsequently once again transformed into an X-ray image by an inverse Fourier transform. According to a further embodiment, a mollifier can be derived during the derivation and a respective grayscale value of the raw X-ray image convoluted with the mollifier is subtracted in order to process each grayscale value defining the X-ray image. According to a further embodiment, the utilized X-ray beam detector can be designed such that, at the utilized X-ray beam dose, the noise power provided by the detector elements during operation under predetermined conditions is at most 10% of the noise power provided by the scintillator layer, preferably in each case at all possible spatial frequencies.

According to another embodiment, an X-ray beam detector comprises an arrangement of light-sensitive detector elements and a scintillator layer on the same, wherein the thickness of the scintillator layer is matched to the noise power of the detector elements such that the noise power of the detector elements, reflected in an X-ray image recorded in conditions predetermined by the X-ray beam detector, is at most 10% as a percentage of the corresponding noise power resulting from quantum noise caused by the scintillator layer.

According to a further embodiment of the X-ray beam detector, the limit of 10% can be individually valid at each spatial frequency. According to a further embodiment of the X-ray beam detector, the X-ray beam detector may comprise an arrangement of light-sensitive detector elements based on CMOS technology and, thereon, a scintillator layer comprising Gd2O2S. According to a further embodiment of the X-ray beam detector, the X-ray beam detector may comprise a data-processing apparatus designed to compensate for the effect of a convolution with a transfer function, caused by the light propagation within the scintillator layer, in the X-ray beam images recorded by the X-ray beam detector.

BRIEF DESCRIPTION OF THE DRAWINGS

In the following text, embodiments are described with reference to the drawings, in which FIG. 1 schematically illustrates the design of an X-ray beam detector, as used in X-ray angiography devices and at X-ray radiation doses occurring therein, and as known from conventional devices.

DETAILED DESCRIPTION

Figure 1:
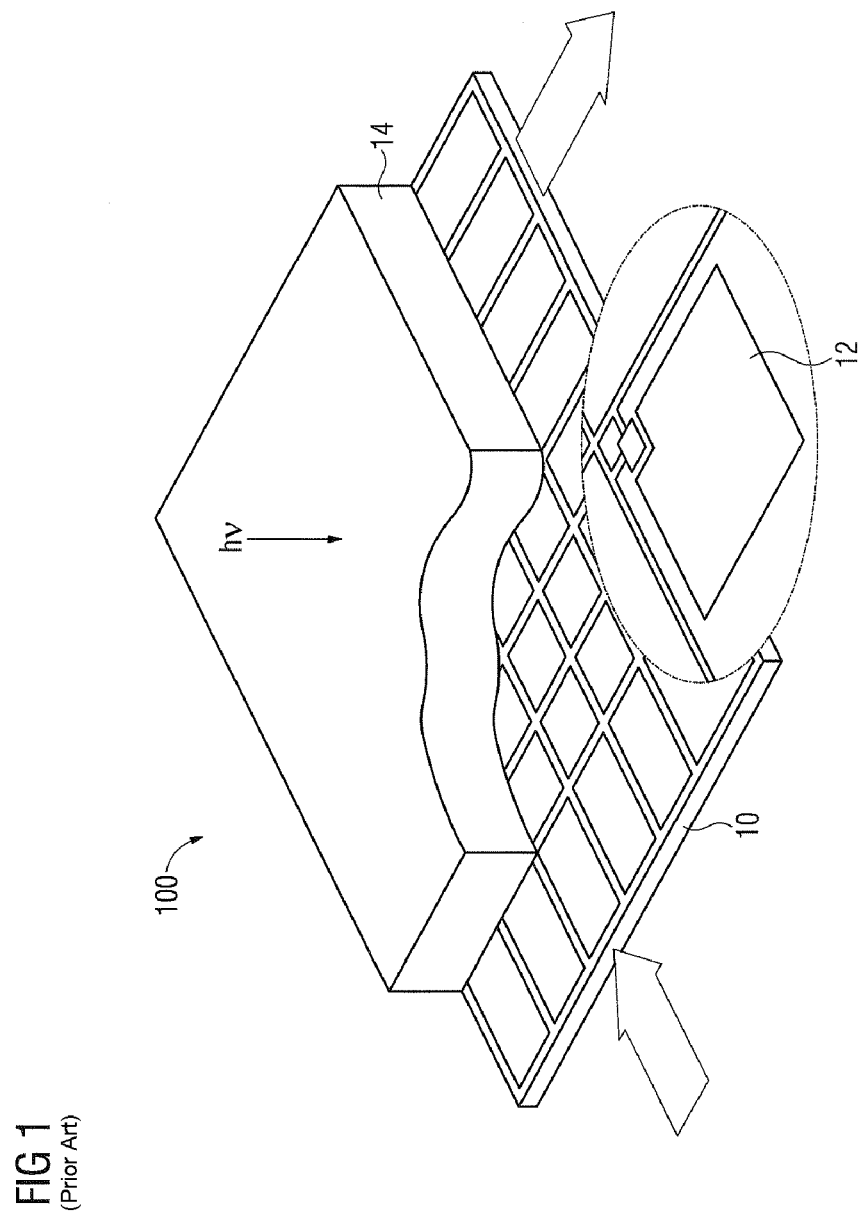
Figure 2:
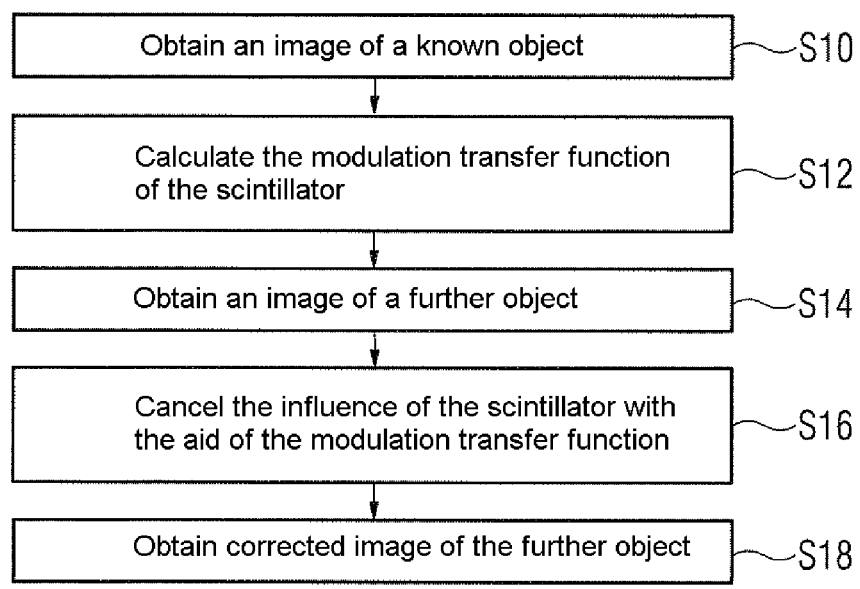
FIG. 2 shows a flowchart for explaining the method according to an embodiment.

Hence, the method according to various embodiments comprises the following steps:

obtaining a test X-ray image of a predetermined object with the aid of the X-ray beam detector, deriving at least one mathematical variable or function of a variable from the test X-ray image, which variable provides information relating to a transfer function, wherein it is such a transfer function that occurs in an assumption for describing the generation and scattering of light in the scintillator layer when there is a convolution of an input signal of the incident X-ray radiation and that is predefined by the properties of the scintillator layer, obtaining a raw X-ray image of an object to be imaged with the aid of the X-ray beam detector, and processing the raw X-ray image using the at least one variable or the at least one function in order to cleanse the effect on the image contrast of (the light propagation within) the scintillator layer, provided that this is made possible by the assumption made, that is to say in order to remove, at least in part, this effect on the image contrast.

The according to various embodiments are based on the discovery that despite the quantum nature there is quasi-determinism as a result of the amount of X-ray quanta and the even larger amount of light quanta produced therefrom, which quasi-determinism can be described by virtue of the fact that a transfer function is associated with the scintillator layer or the light propagation therein. This transfer function may also be called the contrast transfer function, the modulation transfer function or the modulation transmission function.

The test X-ray image is then used to establish either the transfer function itself, or such a variable that allows less precise statements to be made about the transfer function. Obtaining a test X-ray image and, therefrom, deriving at least one mathematical variable or function of a variable therefore corresponds to a measurement of the properties of the scintillator layer, particularly in respect of the light propagation therein. The predetermined object may for example have a sharp, straight-lined edge such that virtually all spatial frequencies are contained in the test X-ray image. As a result of the measurement, there subsequently is the processing of an obtained raw X-ray image.

If a certain high amount of complexity is accepted, it is particularly precise if the test X-ray image is subjected to a Fourier transform and if the Fourier transform of the transfer function is calculated in the frequency space (space of the spatial frequencies) on the basis of a known Fourier transform of the predetermined object.

If the convolution as per the assumption can be described as f(x,y)*g(x,y) in normal real space, where f(x,y) describes the input signal, e.g. the contour of the predetermined object, and where g(x,y) is the transfer function, then the Fourier transform of the convolution emerges multiplicatively from the Fourier transform of the individual functions:

$$F(f*g)=F(f)\cdot F(g).$$

Therefore, if the object, i.e. f(x,y), is known, then its Fourier transform is also known and so, as a result of the Fourier transform of the test X-ray image as per f*g, the Fourier transform of the transfer function may be derived.

Now, it is possible either to calculate the transfer function directly by means of an inverse Fourier transform, or to likewise subject the raw X-ray image to be processed to a Fourier transform and to calculate a Fourier transform of the object to be imaged there from the Fourier transform of the raw X-ray image and the Fourier transform of the transfer function. Thus, if f'(x,y) describes the contour of the unknown object to be imaged and hence if f'(x,y)*g(x,y) describes the raw X-ray image as per the assumption of the convolution with the aid of the transfer function g(x,y), the Fourier transform F(f') is obtained from the relation:

$$F(f') = \frac{F(f*g)}{F(g)}.$$

If the calculated variable F(f') is then subjected to an inverse Fourier transform, an X-ray image is once again obtained, but it now has a high contrast.

The effect of the convolution can also be compensated for by a new convolution. Thus, it is possible to convolute the raw X-ray image with a specific mollifier. An X-ray image is then obtained in which, for example, low spatial frequencies are particularly highlighted. If this raw X-ray image convoluted with the mollifier is subtracted, pixel by pixel (grayscale value by grayscale value), from the raw X-ray image, a processed X-ray image is obtained in which the high spatial frequencies are particularly highlighted, as a result of which the contrast is increased. Here the mollifier may be preferably obtained during the derivation from the test X-ray image. By way of example, the test X-ray image allows identification of which frequencies should be affected by the mollifier and which frequencies should not.

The method works particularly well in all its embodiments if the effects to be compensated for of the convolution with a transfer function, as associated with the scintillator layer, dominate other effects that adversely affect the contrast. Quantitatively, the following statement may be made in this respect: at the utilized X-ray beam dose, the noise power provided by the detector elements during operation should be at most 10% of the noise power provided by the scintillator layer. The noise power can be integrated as a whole or can respectively be established for individual spatial frequencies, wherein the value of 10% should hold true at least for the overall noise power, but should preferably in each case hold true individually at all possible spatial frequencies. This feature of the provided noise power is a property of the X-ray beam detector, which must be provided separately for this purpose and must have a specific design.

Accordingly, the X-ray beam detector according to various embodiments can be characterized in that the thickness of the scintillator layer is matched to the noise power of the detector elements such that the noise power of the detector elements, reflected in an X-ray image recorded with a predetermined X-ray beam dose (at a specific object) by the X-ray beam detector, is at most 10% as a percentage of the corresponding noise power resulting from quantum noise caused by the scintillator layer. This ratio of the two noise powers preferably holds true individually at each spatial frequency.

The X-ray beam detector according to various embodiments may be built in particular if the light-sensitive detector elements are produced using CMOS technology because then they have particularly low levels of noise. In this case it is possible in each case to produce the scintillator layer from gadolinium oxysulfide ($Gd_2O_2S$), more particularly to produce it exclusively from this material. Gadolinium oxysulfide is particularly cost effective. It may also be installed with such a layer thickness that it registers as much of the X-ray radiation as possible. By way of example, in the exemplary case mentioned at the outset, where the X-ray radiation source is operated at 125 kV and the object to be imaged ("patient") has a diameter of 400 mm and consists of water, provision may be made for a layer thickness of 1500 μm with a gadolinium oxysulfide density of 7.5 g/cm$^3$: then the absorption would be approximately 96%, i.e. the efficiency would be significantly increased compared to the use of a conventional cesium iodide scintillator material.

An X-ray beam detector, denoted in its entirety by 100, has a substrate 10, on which photodetector elements 12 are arranged in a two-dimensional array and correspond to the pixels of an X-ray image. There is a scintillator layer 14 on the photodetector elements 12. Said scintillator layer converts incident X-ray quanta hv into light, which is registered by the photodetector elements 12 and the latter then emit digital signals corresponding to the grayscale values in the X-ray images.

In the present case, the photodetector elements 12 should be produced using CMOS technology; as a result of their low electrical noise, these make a particularly low contribution to the overall noise in the finished X-ray images. Similarly, the use of CCD technology with monocrystalline silicon would also be possible.

In the present case, the scintillator layer 14 consists of gadolinium oxysulfide ($Gd_2O_2S$), abbreviated to "GOS". The scintillator layer 14 is 1.5 mm thick, matched to an associated X-ray radiation source that emits an X-ray spectrum generated with 150 kV tube voltage. It absorbs approximately 96% of all X-ray quanta if an object is imaged that substantially consists of water and has a diameter of 400 mm.

The method according to various embodiments starts, as per step S10, by obtaining the image of a known object. By way of example, it is possible simply to image an object with a particularly sharp, straight-lined edge ("ruler"). The object may be described by the function f(x,y) and the effect of the scintillator 14 may be describable by a convolution of this function with a modulation transfer function g(x,y). Hence the modulation transfer function of the scintillator layer 14 may be calculated as per step S12 from the finished X-ray image.

By way of example, this is possible by means of a simple Fourier transform, in which the convolution corresponds to multiplication. Undoing the convolution then corresponds to dividing.

In step S14, the image of a further object is now obtained. The further object may be described by a function f'(x,y). If the other conditions, in particular the X-ray quanta energy, are the same when the image of the further object f'(x,y) is obtained as when the image of a known object is obtained, this X-ray image of the further object S14 can be substantially described by a convolution of the function f' and the modulation transfer function g, and since the modulation transfer function g now is known, f' may be calculated, or it may at least be possible to cancel the influence of the modulation transfer function in the finished X-ray image, by subjecting the finished X-ray image to a Fourier transform, dividing the individual Fourier coefficients by the corresponding coefficients of the modulation transfer function, and then performing an inverse Fourier transform. Thus, a corrected image of the further object is then obtained as per step S18. In this corrected image, the influence of the scintillator layer 14 has been cancelled to the extent that it can be described by a convolution with a modulation transfer function. It is for this reason that the scintillator layer does not need to have an exceptional structure and may have the aforementioned thickness of 1.5 mm.

Other methods for canceling out an influence of the scintillator in an image of the further object 14 are feasible. In particular, it is useful to establish a mollifier that matches the scintillator layer 14, and to convolute this mollifier with the image of the further object and then to subtract the result of the multiplication from the image of the further object in order to obtain an image with highlighted high spatial frequencies.

To the extent that the present application talks of obtaining an image, the assumption is made that an X-ray image-recording device, more particularly an X-ray angiography device with an X-ray C-arm, automatically performs appropriate steps, wherefore merely the reception of an input signal by an operating person is necessary.

What is claimed is:

1. A method for obtaining high-contrast X-ray images with the aid of an X-ray beam detector, which has an arrangement of light-sensitive detector elements beneath a scintillator layer, wherein each detector element provides a grayscale value in a pixel arrangement for defining an X-ray image, comprising the following steps:
   obtaining a test X-ray image of a predetermined object with the aid of the X-ray beam detector,
   deriving at least one mathematical variable or at least one function of a variable from the test X-ray image, which variable, under the assumption that the generation and scattering of light in the scintillator layer is understood as a convolution of an input signal of the incident X-ray radiation with a transfer function, provides information relating to the transfer function,
   obtaining a raw X-ray image of an object to be imaged with the aid of the X-ray beam detector, and
   processing the raw X-ray image using the at least one variable or the at least one function in order to remove, at least in part, an effect on the image contrast by the light propagation within the scintillator layer.

2. The method according to claim 1, wherein the test X-ray image is subjected to a Fourier transform a Fourier-transformed transfer function is calculated in a frequency space on the basis of a known Fourier transform of the predetermined object.

3. The method according to claim 2, wherein the raw X-ray image is subjected to a Fourier transform and a Fourier transform of the object to be imaged is calculated from the Fourier transform of the raw X-ray image and the Fourier transform of the transfer function, and the Fourier transform of said object to be imaged is subsequently transformed into an X-ray image by an inverse Fourier transform.

4. The method according to claim 1, wherein a mollifier is derived during the derivation and a respective grayscale value of the raw X-ray image convoluted with the mollifier is subtracted in order to process each grayscale value defining the X-ray image.

5. The method according to claim 1, wherein the utilized X-ray beam detector is designed such that, at a utilized X-ray beam dose, the noise power provided by the detector elements during operation under predetermined conditions is at most 10% of the noise power provided by the scintillator layer.

6. The method according to claim 1, wherein the utilized X-ray beam detector is designed such that, at a utilized X-ray beam dose, the noise power provided by the detector elements during operation under predetermined conditions is at most 10% of the noise power provided by the scintillator layer in each case at all possible spatial frequencies.

7. An X-ray beam detector with an arrangement of light-sensitive detector elements and a scintillator layer on the same, wherein the thickness of the scintillator layer is matched to a noise power of the detector elements such that the noise power of the detector elements, reflected in an X-ray image recorded in conditions predetermined by the X-ray beam detector, is at most 10% as a percentage of the corresponding noise power resulting from quantum noise caused by the scintillator layer.

8. The X-ray beam detector as claimed in claim 7, in which the limit of 10% is individually valid at each spatial frequency.

9. The X-ray beam detector according to claim 7, comprising an arrangement of light-sensitive detector elements based on CMOS technology and, thereon, a scintillator layer comprising $Gd_2O_2S$.

10. The X-ray beam detector according to claim 7, comprising a data-processing apparatus designed to compensate for an effect of a convolution with a transfer function, caused by the light propagation within the scintillator layer, in the X-ray beam images recorded by the X-ray beam detector.

11. A system for obtaining high-contrast X-ray images with the aid of an X-ray beam detector, which has an arrangement of light-sensitive detector elements beneath a scintillator layer, wherein each detector element provides a grayscale value in a pixel arrangement for defining an X-ray image, wherein the system is configured:

to obtain a test X-ray image of a predetermined object with the aid of the X-ray beam detector, to derive at least one mathematical variable or at least one function of a variable from the test X-ray image, which variable, under the assumption that the generation and scattering of light in the scintillator layer is understood as a convolution of an input signal of the incident X-ray radiation with a transfer function, provides information relating to the transfer function, to obtain a raw X-ray image of an object to be imaged with the aid of the X-ray beam detector, and to process the raw X-ray image using the at least one variable or the at least one function in order to remove, at least in part, an effect on the image contrast by the light propagation within the scintillator layer.

12. The system according to claim 11, wherein the test X-ray image is subjected to a Fourier transform and the Fourier-transformed transfer function is calculated in the frequency space on the basis of a known Fourier transform of the predetermined object.

13. The system according to claim 12, wherein the raw X-ray image is subjected to a Fourier transform and a Fourier transform of the object to be imaged is calculated there from the Fourier transform of the raw X-ray image and the Fourier transform of the transfer function, and this Fourier transform of said object to be imaged is subsequently once again transformed into an X-ray image by an inverse Fourier transform.

14. The system according to claim 11, wherein a mollifier is derived during the derivation and a respective grayscale value of the raw X-ray image convoluted with the mollifier is subtracted in order to process each grayscale value defining the X-ray image.

15. The system according to claim 11, wherein the utilized X-ray beam detector is designed such that, at a utilized X-ray beam dose, the noise power provided by the detector elements during operation under predetermined conditions is at most 10% of the noise power provided by the scintillator layer.

16. The system according to claim 11, wherein the utilized X-ray beam detector is designed such that, at a utilized X-ray beam dose, the noise power provided by the detector elements during operation under predetermined conditions is at most 10% of the noise power provided by the scintillator layer in each case at all possible spatial frequencies.

* * * * *